3,659,004
SUBSTITUTED 3-AMINOBENZOTHIOPHENES
Klaus Wagner and Ernst Roos, Cologne, Germany, assignors to Farbenfabriken Bayer Aktiengesellschaft, Leverkusen, Germany
No Drawing. Filed Dec. 5, 1969, Ser. No. 882,748
Claims priority, application Germany, Jan. 11, 1969, P 19 01 291.0
Int. Cl. C07d 63/22; C08f 45/14
U.S. Cl. 260—330.5     2 Claims

ABSTRACT OF THE DISCLOSURE

Novel 3-aminobenzothiophenes are obtained by a process wherein a mercaptomethyl compound is reacted in the presence of a base with benzonitrile derivatives.

The novel compounds, i.e., 2-carbethoxy-3-amino-5,7-dinitrobenzothiophene, can be used for dying plastics as polyvinyl chloride.

---

This invention relates to novel 3-aminobenzothiophenes and to a process for the preparation thereof.

The novel compounds according to the invention are 3-aminobenzothiophenes of the general formula

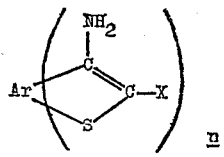

wherein Ar represents an optionally substituted benzene radical, X represents an electronegative substituent and $n$ represents 1, 2 or 3.

The radical Ar can be substituted by halogen (preferably chlorine) or by cyano, nitro, sulphonyl, carboalkoxy, alkoxy and/or alkyl, and/or by one or two additional fused thiophene rings.

The radical X is preferably acyl (especially acetyl or benzoyl), carboalkoxy, cyano or sulphonyl.

The compounds according to the invention are prepared by a process wherein a mercaptomethyl compound of the formula $$HS-CH_2-X$$

is reacted, in the presence of a base, with a benzonitrile derivative of the formula

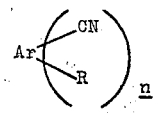

in which formulae Ar, X and $n$ have the meanings given above, and R represents a halogen atom (especially chlorine), or an alkoxy, alkylthio, aryloxy or arylthio group having up to 12 carbon atoms in the hydrocarbon radicals. The reaction is optionally carried out in the presence of an inert solvent.

Examples of suitable benzonitrile derivatives are represented by the following formulae:

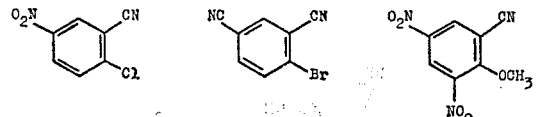

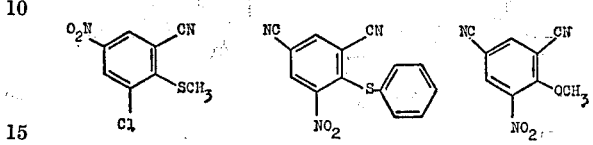

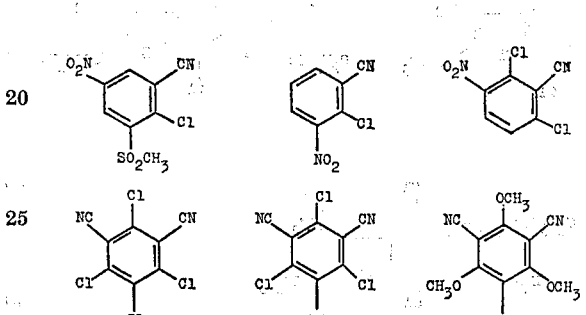

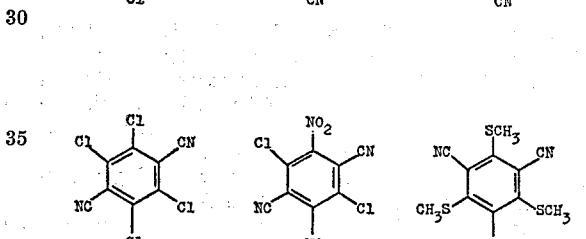

Examples of suitable mercaptomethyl compounds include mercaptoacetone, mercaptoacetaldehyde, phenacyl mercaptan, thioglycolic acid ethyl ester, mercaptomethyl, methyl sulphone, and mercaptoacetonitrile.

Thus, in the reaction which takes place in accordance with the invention, not only is the group R split off in the form of the corresponding hydrogen halide, alcohol or mercaptan, cyclisation also takes place with the cyano group in the o-position to form the 3-aminobenzothiophene derivative. Some of the 3-aminobenzothiophenes that can be obtained by the process according to the invention are reproduced below:

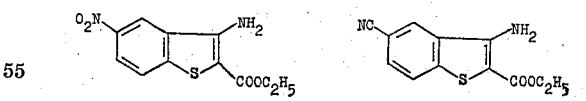

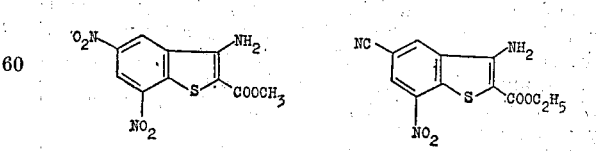

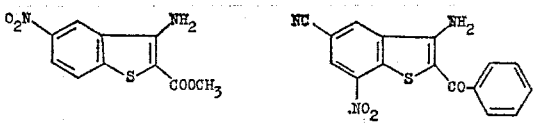

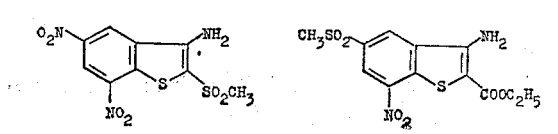

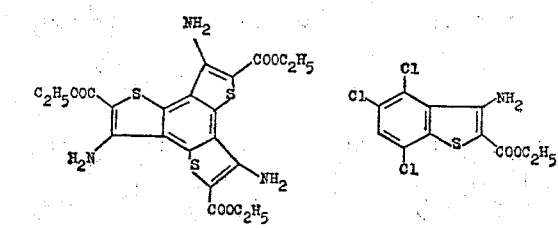

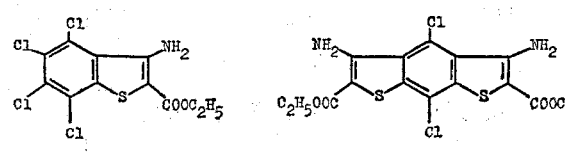

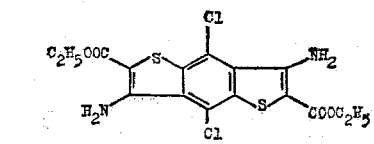

The reaction according to the invention is carried out, preferably in polar organic solvents, at a temperature of from 10 to 180° C., especially at a temperature of from 20 to 100° C., in the presence of bases. Methanol, ethanol, propanol, dimethyl formamide, and ethylene glycol monoethyl ether are all suitable solvents.

Normally, the process is carried out by reacting a solution of the corresponding benzonitrile derivative and an equimolar quantity by weight of the mercaptomethyl compound, for example in methanol, in the case of o-halogen benzonitriles with somewhat more than the equimolar quantity by weight of a tertiary base such as pyridine, triethylamine or an alkali metal hydroxide such as sodium hydroxide, and in the case of o-alkoxy benzonitrile, for example, with a catalytic quantity of a base. The reaction mixture is then stirred for a while at a temperature around 60° C.

When the reaction mixture is cooled, the novel 3-aminobenzothiophenes formed during the reaction usually crystallise out in the form of yellow to red crystalline compounds, can be separated by the usual methods and after washing with water or methanol can be isolated in pure form and in high yields.

As yellow, orange or red pigments, the 3-aminobenzothiophenes are suitable for example for dyeing plastics.

In order to illustrate the use of the compounds according to the invention as pigments for plastics, a mixture of 65 parts by weight of polyvinyl chloride, 35 parts by weight of diisooctyl phthalate, 2 parts by weight of dibutyl tin mercaptide, 0.5 part by weight of titanium dioxide and 0.5 part by weight of 2-carbethoxy-3-amino-5,7-dinitrobenzothiophene, which was finely distributed by grinding with sodium chloride in the presence of N-methyl pyrrolidone, is coloured on mixing rolls at 165° C. A red-coloured material is obtained which may be used in the production of sheeting or mouldings. The colour finish is distinguished by outstanding fastness to light and plasticisers.

Also the other compounds obtainable according to the process of this invention can be used in the same way.

The process according to the invention is illustrated by the following examples:

EXAMPLE 1

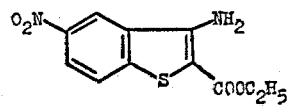

54.6 g. (0.3 mol) of 2-chloro-5-nitrobenzonitrile and 36 g. (0.3 mol) of thioglycolic acid ethyl ester are dissolved in 250 cc. of ethylene glycol monoethyl ether. 33 g. (0.3 mol+10% excess) of triethylamine are added dropwise to this solution with stirring at 80 to 90° C., after which the reaction mixture is stirred for another 5 hours at 110° C. After cooling, the orange crystalline product which is precipitated is filtered under suction, and the filter residue is washed with water and then with methanol and finally dried. 2-carbethoxy-3-amino-5-nitrobenzothiophene melting at 212–213° C. is obtained in a yield of 70 g. (88% of the theoretical).

Analysis.—$C_{11}H_1ON_2O_4S$ (266.2). Calculated (percent): C, 49.6; H, 3.8; N, 10.6; S, 12.0. Found (percent): C, 49.6; H, 4.1; N, 10.7; S, 12.0.

EXAMPLE 2

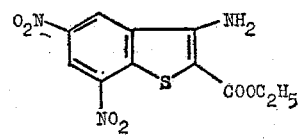

22.7 g. (0.1 mol) of 2-chloro-3,5-dinitrobenzonitrile and 12.0 g. (0.1 mol) of thioglycolic acid ethyl ester are dissolved in 300 cc. of benzene. 11 g. (0.1 mol+10% excess) of triethylamine are added dropwise to this solution with stirring at 40 to 60° C., after which the reaction mixture is stirred for another 3 hours at 80° C. After cooling, the deep red crystalline product is filtered under suction, and the filter residue is washed with water and then with methanol and finally dried. The 2-carbethoxy-3-amino-5,7 - dinitro - benzothiophene crystallises from ethylene glycol monoethyl ether in the form of blood red needles melting at 234–236° C. Yield 25 g. (80% of the theoretical).

Analysis.—$C_{11}H_9N_3O_6S$ (311.2). Calculated (percent): C, 42.5; H, 2.9; O, 30.9; N, 13.4; S, 10.3. Found (percent): C, 42.8; H, 3.5; O, 30.1; N, 13.6; S, 10.3.

EXAMPLE 2a

If 2-methoxy-3,5-dinitrobenzonitrile is used instead of 2-chloro-3,5-dinitrobenzonitrile as the starting material and if the reaction is carried out in the presence of a catalytic quantity of triethylamine (2 cc.), the 2-carbethoxy-3-amino-5,7-dinitro-benzothiophene is obtained in a yield of 75%.

EXAMPLE 3

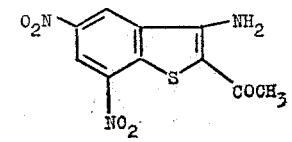

2 cc. of triethylamine are added at room temperature to a solution of 44.6 g. (0.2 mol) of 2-methoxy-3,5-dinitrobenzonitrile and 18 g. (0.2 mol) of mercaptoacetone in 400 cc. of methanol. After the exothermic reaction has abated, the dark red reaction mixture is kept boiling for another 3 hours and then allowed to cool. The precipitated product is filtered under suction, and the filter residue is washed with water and methanol and recrystallised from ethylene glycol monoethyl ether. 2-acetyl-3-amino-5,7-dinitro-benzothiophene is obtained in the form of dark red glossy crystals melting at 290 to 291° C., in a yield of 10 g., (17% of the theoretical).

*Analysis.*—$C_{10}H_7N_3O_5S$ (281.2). Calculated (percent): C, 42.7; H, 2.5; O, 28.5; N, 14.9; S, 11.4. Found (percent): C, 43.2; H, 2.6; O, 28.2; N, 15.3; S, 11.5.

EXAMPLE 4

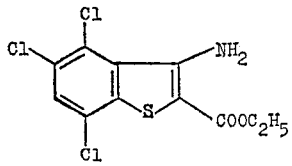

24.1 g. (0.1 mol) of 2,3,5,6-tetrachloro-benzonitrile and 12.0 g. (0.1 mol) of thioglycolic acid ethyl ester are dissolved in 300 cc. of ethanol. 10.1 g. (0.1 mol) of triethyl-amine are added dropwise to this solution at room temperature, and the reaction mixture is boiled under reflux for 3 hours. After cooling, 500 cc. of water are added to the yellow suspension, followed by filtration under suction and recrystallisation of the filter residue from benzene. 2-carbethoxy-3-amino-4,5,7-trichloro-benzothiophene is obtained in the form of yellow crystals melting at 158–160° C., in a yield of 20 g. (62% of the theoretical).

*Analysis.*—$C_{11}H_8Cl_3NO_2S$ (324.5). Calculated (percent): C, 40.6; H, 2.4; Cl, 32.8; N, 4.3; O, 9.8; S, 9.8. Found (percent): C, 40.7; H, 2.6; Cl, 32.3; N, 4.7; O, 9.7; S, 9.6.

EXAMPLE 5

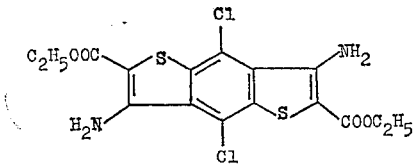

40.4 g. (0.4 mol) of triethylamine are added at 20 to 40° C. to 26.6 g. (0.1 mol) of tetrachloroterephthalic acid dinitrile and 24 g. (0.2 mol) of thioglycolic acid ethyl ester and 300 ml. of alcohol. The orange-coloured suspension is boiled under reflux for 10 hours, 500 ml. of water are added and the reaction mixture is filtered under suction. After drying, the product, 2,6-bis-carbethoxy-3,7-diamino-4,8-dichloro-thieno[2,3-f]benzothiophene, is recrystallised from chlorobenzene. Yield 24 g. (55% of the theoretical) of orange crystals.

*Analysis.*—$C_{16}H_{14}Cl_2N_2O_4S_2$ (433) M.P. 286–287° C. Calculated (percent): C, 44.34; H, 3.23; Cl, 16.4; N, 6.47; O, 14.78; S, 14.78. Found (percent): C, 43.8; H, 3.2; Cl, 17.4; N, 6.5; O, 14.4; S, 13.9.

EXAMPLE 6

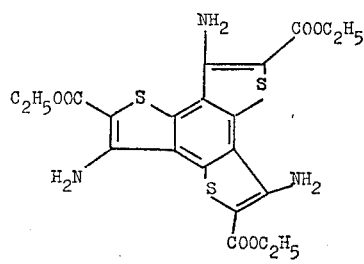

26.65 g. (0.1 mol) of trichlorotrimesic acid nitrile and 36 g. (0.3 mol) of thioglycolic acid ethyl ester are mixed in 400 ml. of ethanol, and 40.4 g. (0.4 mol) of triethyl-amine is added to the resulting mixture at 20 to 40° C. while cooling with ice water. The yellow suspension formed is boiled under reflux for 10 hours, stirred after cooling with 500 ml. of water, filtered under suction and recrystallised from dimethyl formamide, giving 2,5,8-tris-carbethoxy-3,6,9-triamino - dithieno[2,3-e; 2′,3′-g]-benzothiophene in a yield of 45 g. (89% of the theoretical) in the form of yellow crystals melting at 290–291° C.

*Analysis.*—$C_{21}H_{21}N_3O_6S_3$ (507). Calculated (percent): C, 49.70; H, 4.14; N, 8.28; O, 18.93; S, 18.93. Found (percent): C, 49.6; H, 4.4; N, 8.4; O, 19.0; S, 18.9.

What we claim is:

1. 3-aminobenzothiophenes having the formula

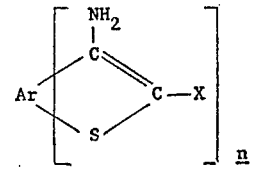

wherein

Ar is a benzene radical or a benzene radical having substituents selected from the group of halogen, cyano, nitro and methylsulfonyl;

X is an electronegative substituent selected from the group of acetyl, benzoyl, formyl, lower carbalkoxy, cyano and methylsulfonyl; and $n$ is 2.

2. 2,6 - bis-carbethoxy-3,7-diamino-4,8-dichloro-thieno-[2,3-f]benzothiophene.

References Cited

UNITED STATES PATENTS 3,433,874   3/1969   Geering _____ 424—275

HENRY R. JILES, Primary Examiner

C. M. SHURKO, Assistant Examiner

U.S. Cl. X.R.

260—41 C